United States Patent
Faubert et al.

(10) Patent No.: US 6,793,268 B1
(45) Date of Patent: Sep. 21, 2004

(54) GLIDING DOOR ASSEMBLY FOR A MOTOR VEHICLE

(75) Inventors: Robert J Faubert, Rochester Hills, MI (US); Hasan H Ramouni, Dearborn, MI (US); Donald Varner, Holly, MI (US); Terence W Haskin, Lapeer, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/435,867

(22) Filed: May 12, 2003

(51) Int. Cl.$^7$ ................................................ B60J 5/04
(52) U.S. Cl. ........................... 296/146.12; 296/146.11; 296/155; 49/502
(58) Field of Search .......................... 296/146.1, 146.4, 296/146.11, 146.12, 155; 49/502

(56) References Cited

U.S. PATENT DOCUMENTS

| | | | | |
|---|---|---|---|---|
| 4,641,881 A | * | 2/1987 | Nomura et al. | 296/202 |
| 4,945,677 A | * | 8/1990 | Kramer | 49/210 |
| 5,826,306 A | | 10/1998 | Faubert et al. | |
| 5,832,668 A | | 11/1998 | Faubert et al. | |
| 5,836,639 A | | 11/1998 | Kleefeldt et al. | |
| 5,921,613 A | * | 7/1999 | Breunig et al. | 296/155 |
| 5,934,022 A | | 8/1999 | Faubert | |
| 6,030,024 A | * | 2/2000 | Schmidhuber et al. | 296/146.12 |
| 6,183,039 B1 | * | 2/2001 | Kohut et al. | 296/155 |
| 6,196,618 B1 | * | 3/2001 | Pietryga et al. | 296/146.11 |
| 6,206,455 B1 | | 3/2001 | Faubert et al. | |
| 6,213,535 B1 | * | 4/2001 | Landmesser et al. | 296/146.12 |
| 6,256,930 B1 | | 7/2001 | Faubert et al. | |
| 6,276,743 B1 | | 8/2001 | Jyawook et al. | |
| 6,286,261 B1 | | 9/2001 | Hackstock | |
| 6,286,890 B1 | | 9/2001 | Faubert | |
| 6,382,705 B1 | * | 5/2002 | Lang et al. | 296/146.12 |
| 6,386,621 B1 | * | 5/2002 | Kozak et al. | 296/155 |
| 6,447,054 B1 | * | 9/2002 | Pietryga et al. | 296/202 |
| 6,511,120 B1 | | 1/2003 | Mitts | |
| 6,525,499 B2 | | 2/2003 | Naganuma | |
| 6,530,619 B2 | | 3/2003 | Fukomoto et al. | |
| 6,591,452 B2 | * | 7/2003 | Jacquin | 16/332 |
| 6,681,448 B2 | * | 1/2004 | Liang | 16/336 |

* cited by examiner

Primary Examiner—D. Glenn Dayoan
Assistant Examiner—Greg Blankenship
(74) Attorney, Agent, or Firm—Edwin W. Bacon, Jr.

(57) ABSTRACT

The invention provides a door assembly for a motor vehicle. The motor vehicle includes a body portion including at least one aperture formed therein. The door assembly includes a door moveable between a closed position substantially covering the aperture and an open position substantially clearing the aperture. At least one hinge assembly is provided including a substantially elongated lever with first and second pivots. The first pivot is operably attached to the door and the second pivot is operably attached to the vehicle. The lever and the first and second pivots provide an arcuate path movement of the door lengthwise of the vehicle.

16 Claims, 5 Drawing Sheets

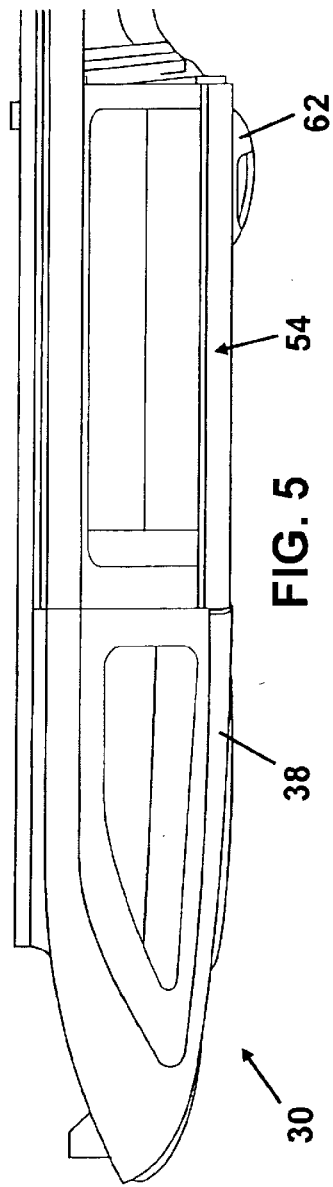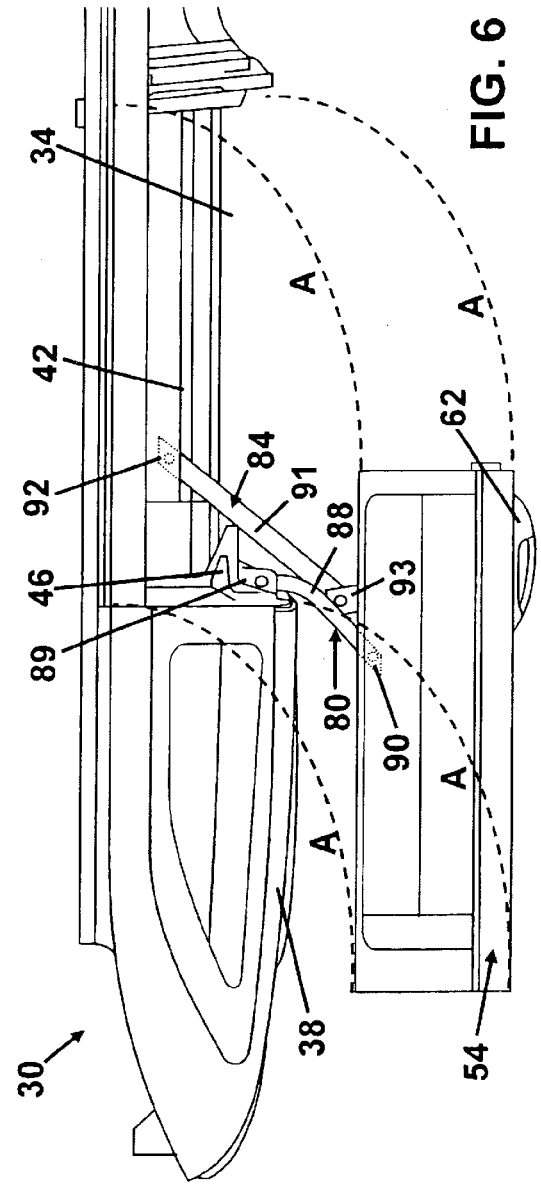

GLIDING DOOR ASSEMBLY FOR A MOTOR VEHICLE

TECHNICAL FIELD OF THE INVENTION

The present invention relates generally to vehicular doors. More particularly, the invention relates to a gliding door assembly for a motor vehicle.

BACKGROUND OF THE INVENTION

In various types of motor vehicles, including minivans, delivery vans, and the like, it has become common practice to provide the vehicle body with one or more relatively large side openings that are located immediately behind the front doors. The vehicle front doors may be attached to the vehicle with one or more conventional hinge-type mounts, which are occasionally used for the side doors as well. Numerous hinge-type door mount designs are known and may provide a reliable and relatively inexpensive strategy for mounting a vehicle door. These hinge-type door mounts, however, are associated with at least one drawback.

A major shortcoming of the conventional hinged hinge-type mounts pertains to clearance. As the hinged door is opened, it may swing through an arcuate pathway requiring a relatively large clearance space. Should the vehicle park in a confined space, it may easily sustain damage and/or impart damage as the door opens and closes. In fact, various strategies have been developed to minimize damage to a vehicle door imparted from other vehicles with hinged doors. As such, it would be desirable to provide a strategy for allowing a vehicle door to be opened with minimal clearance.

To overcome some of the shortcomings associated with the conventional hinge-type mounted door, numerous sliding door assembly designs have been developed. The sliding door is typically mounted on horizontal tracks on the vehicle body for guided sliding movement between a closed position flush with the vehicle body closing the side opening and an open position located outward of and alongside the vehicle body rearward of the side opening. The sliding door may be operated manually, as is most generally the case, or with a power operated system.

An example of a power sliding door for a motor vehicle includes U.S. Pat. No. 6,530,619 to Fukumoto et al. The '619 patent discloses a sliding vehicle door system including three parallel rails disposed on the vehicle that each serve to guide a roller unit. The roller units are rotatably supported by a sliding door. During sliding movement of the guide roller units relative to or along the respective guide rails, the sliding door is guided by the guide rails and is thus slidably moved to effect the covering and uncovering operation of a door opening portion. The sliding vehicle door system further includes a driving mechanism installed in the sliding vehicle door for automatically opening the door.

The sliding door design, such as the one disclosed by the '619 patent, has the advantage over the hinged-type design of opening with minimal clearance thereby reducing the likelihood of causing damage. However, the sliding door designs typically include a relatively large number of parts, both fixed and moving, and a complicated design, which together may increase the cost and failure rate of the assembly. Accordingly, it would be desirable to provide a strategy for reducing the number of parts and complexity associated with sliding door designs while maintaining its many advantages.

Therefore, it would be desirable to provide a strategy for providing a gliding door for a motor vehicle that overcomes the aforementioned and other disadvantages.

SUMMARY OF THE INVENTION

A first aspect of the present invention provides a door assembly for a motor vehicle including an aperture formed therein. The door assembly includes a door moveable between a closed position substantially covering the aperture and an open position substantially clearing the aperture. At least one hinge assembly is provided including a substantially elongated lever with first and second pivots. The first pivot is operably attached to the door and the second pivot is operably attached to the vehicle. The lever and the first and second pivots provide an arcuate path movement of the door lengthwise of the vehicle.

A second aspect of the invention provides a motor vehicle including a body portion with at least one aperture formed therein. The motor vehicle further includes at least one door assembly including a door in accordance with the first aspect of the present invention.

A third aspect of the present invention provides a door assembly for a motor vehicle including an aperture formed therein. The door assembly includes means for moving a door between a closed position substantially covering the aperture and an open position substantially clearing the aperture. The door assembly further includes means for providing an arcuate path movement of the door lengthwise of the vehicle.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 5 is an elevated perspective view of a right sidewall portion of the vehicle including the side door assembly of FIG. 1, showing the side door assembly in the closed position;

FIG. 6 is an elevated perspective view similar to that of FIG. 5, showing the side door assembly in the open position;

DESCRIPTION OF THE PRESENTLY PREFERRED EMBODIMENTS

Figure 1:
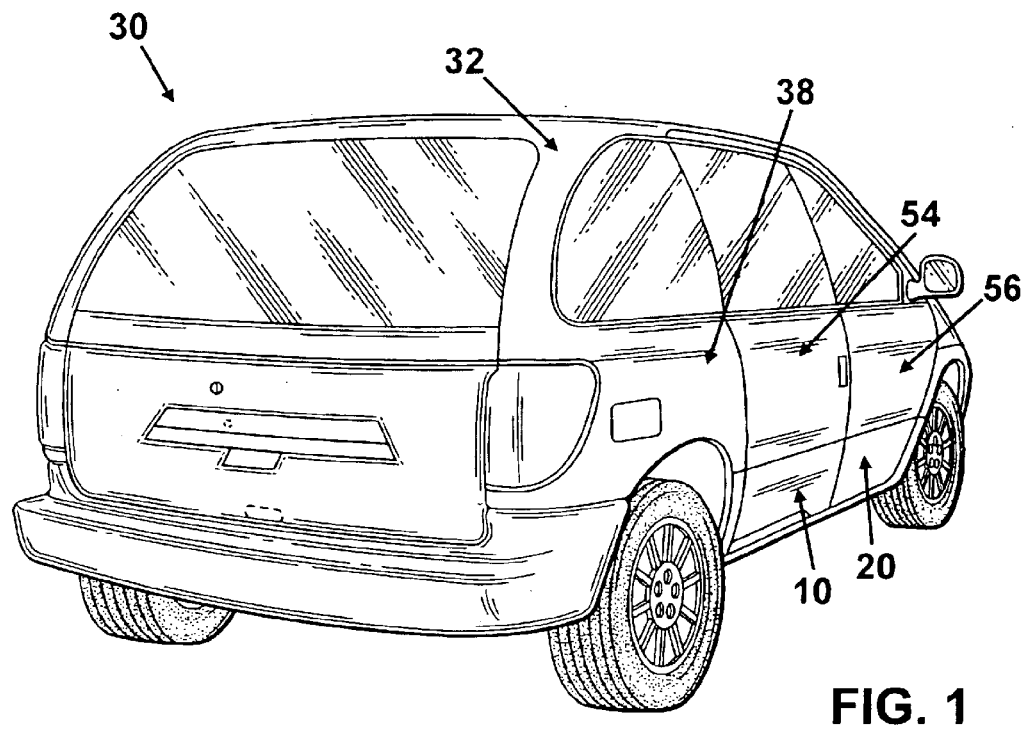
FIG. 1 is a perspective view of an exemplary vehicle equipped with right front and side door assemblies in accordance with the present invention.
Figure 2:
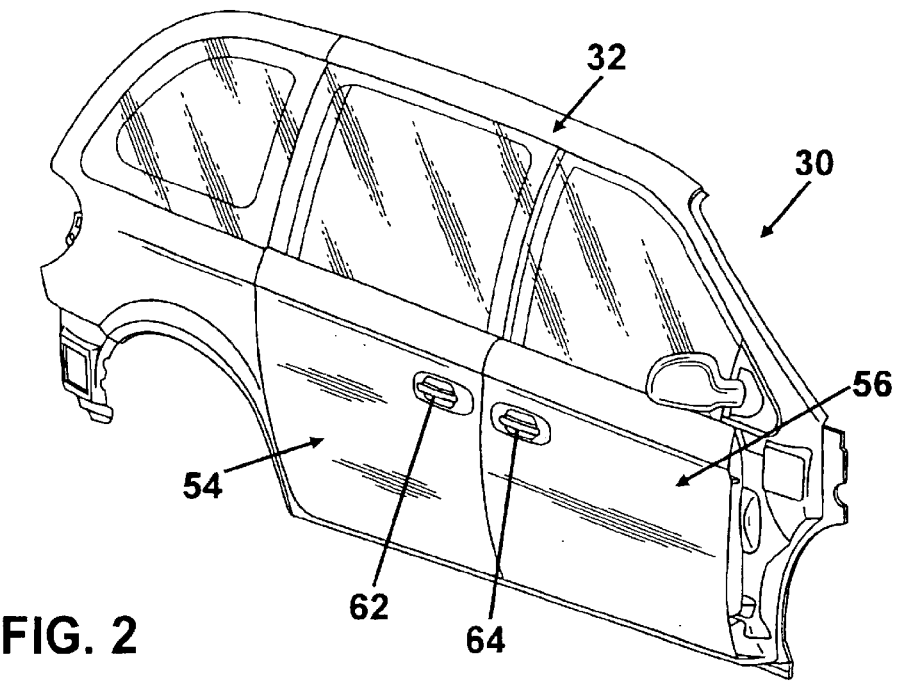
FIG. 2 is a perspective view of a right sidewall portion of the vehicle of FIG. 1, shown with the front and side door assemblies in a closed position.

Referring to the drawings, wherein like reference numerals refer to like elements, FIG. 1 shows two gliding door assemblies constructed in accordance with the present invention and generally identified by reference numerals 10 and 20. The door assemblies 10, 20 are incorporated into a vehicle 30 illustrated as a minivan. However, it will be understood by those skilled in the art that the teachings of the present invention have applicability to other vehicle types in which a gliding door is desired.

Figure 3:
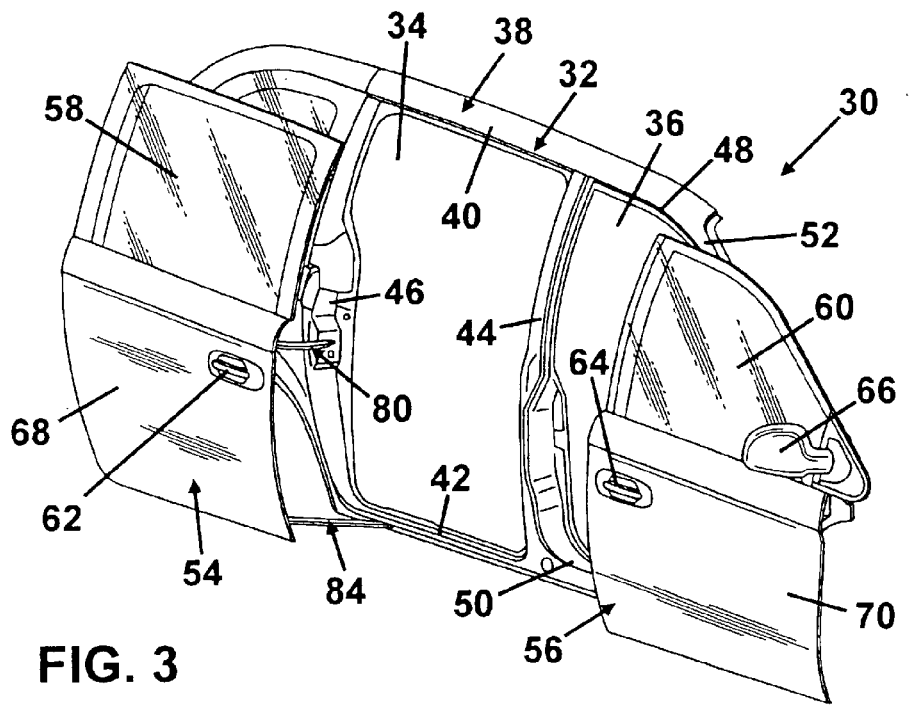
FIG. 3 is a perspective view similar to that of FIG. 2, showing the front and side door assemblies in an open position.
Figure 4:
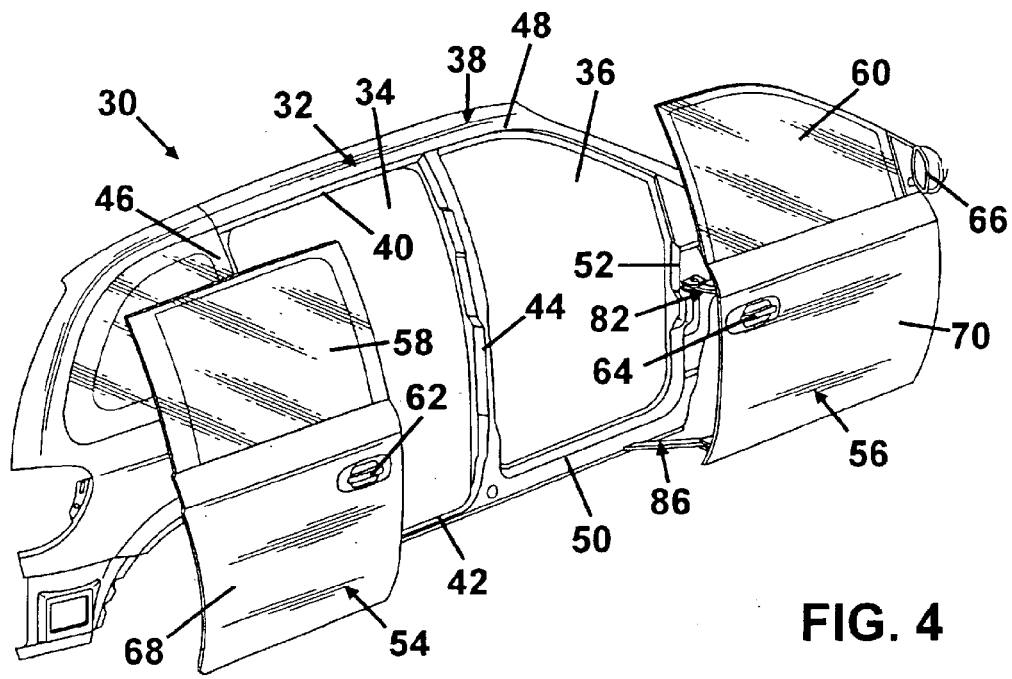
FIG. 4 is an alternate side perspective view of the right sidewall portion shown in FIG. 3.
Figure 7:
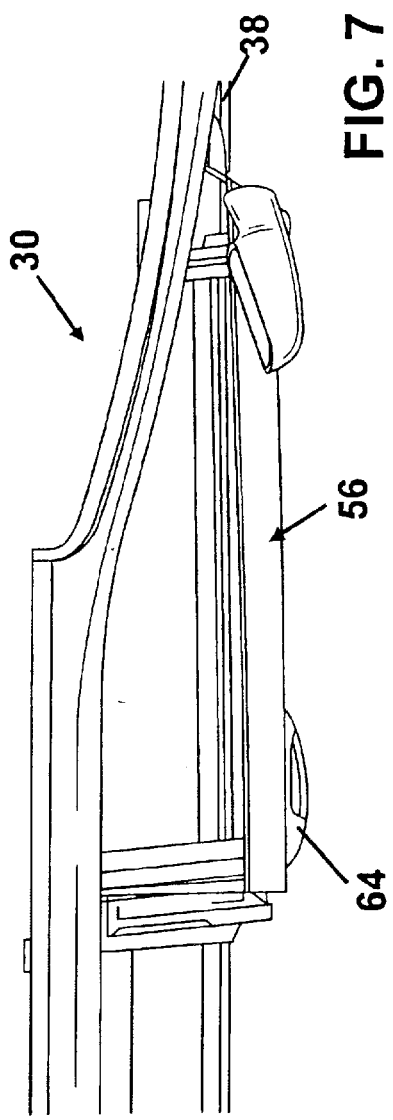
FIG. 7 is an elevated perspective view of a right sidewall portion of the vehicle including the front door assembly of FIG. 1, showing the front door assembly in the close position.

Referring to FIGS. 3 and 4, the vehicle 30 is shown to include a vehicle body 32 having a side aperture 34 and a front aperture 36 formed within a right sidewall portion 38 of the vehicle body 32. Side aperture 34 may be positioned immediately rearward of the front aperture 36. Side aperture 34 may be defined within right sidewall portion 38 by an upper horizontal channel 40, a lower horizontal channel 42, a central body pillar 44 and a rear body pillar 46. Front aperture 36 may be defined within right sidewall portion 38 by an upper horizontal channel 48, a lower horizontal channel 50, the central body pillar 44, and a front body pillar 52.

Side and front apertures 34, 36 may be adapted for receiving a side door 54 and a front door 56, respectively. Doors 54, 56 may include various types, numbers, and arrangements of windows 58, 60, door handle mechanisms 62, 64, mirror 66, side panels 68, 70, and the like as is known in the art. Furthermore, the doors 54, 56 may be manufactured from materials commonly used for vehicle doors as is known in the art. While not illustrated, it will be understood that the vehicle 30 may be equipped with one or more like door assemblies on the left sidewall thereof and/or other vehicle 30 surface(s).

With reference to FIGS. 1, 2, 5 and 7, the side and front doors 54, 56 are both shown in a closed position substantially covering the side and front apertures, respectively. In the closed position, the doors 54, 56 may be substantially flush and parallel with the right sidewall portion 38. Door handle mechanisms 62, 64 may secure the doors 54, 56 from undesired opening.

During operation, the side and front doors 54,56 may be opened from the closed position to an open position substantially clearing the side and front apertures 34, 36, the open position shown in FIGS. 3, 4, 6, and 8. Doors 54, 56 may include means for securing the door in the open position to prevent undesired closing. Doors 54, 56 may be moveably positioned between the closed and open positions following along an arcuate path lengthwise of the side of the vehicle, as shown by lines A, B in FIGS. 6 and 8 respectively. Doors 54, 56 may remain substantially parallel with the sidewall portion 38 during the arcuate path movement. Preferably, the doors 54, 56 utilize minimal clearance away from the sidewall portion 38 (i.e., less clearance than conventional hinge-type mounted doors) thereby minimizing the likelihood of sustaining or imparting damage when opening and closing.

Referring to FIGS. 3, 4, 6 and 8, one upper hinge assembly 80, 82 and one lower hinge assembly 84, 86 are shown operably attached to each of the side and front doors 54, 56. In addition, the upper and lower hinge assemblies 80, 82, 84, 86 are shown operably attached to the vehicle 30. Those skilled in the art will recognize that the number of hinge assemblies of the present invention used to attach the doors to the vehicle may vary. More or less than two hinge assemblies may be provided as part of the door assembly while still providing the function and advantages of the present invention.

Figure 8:
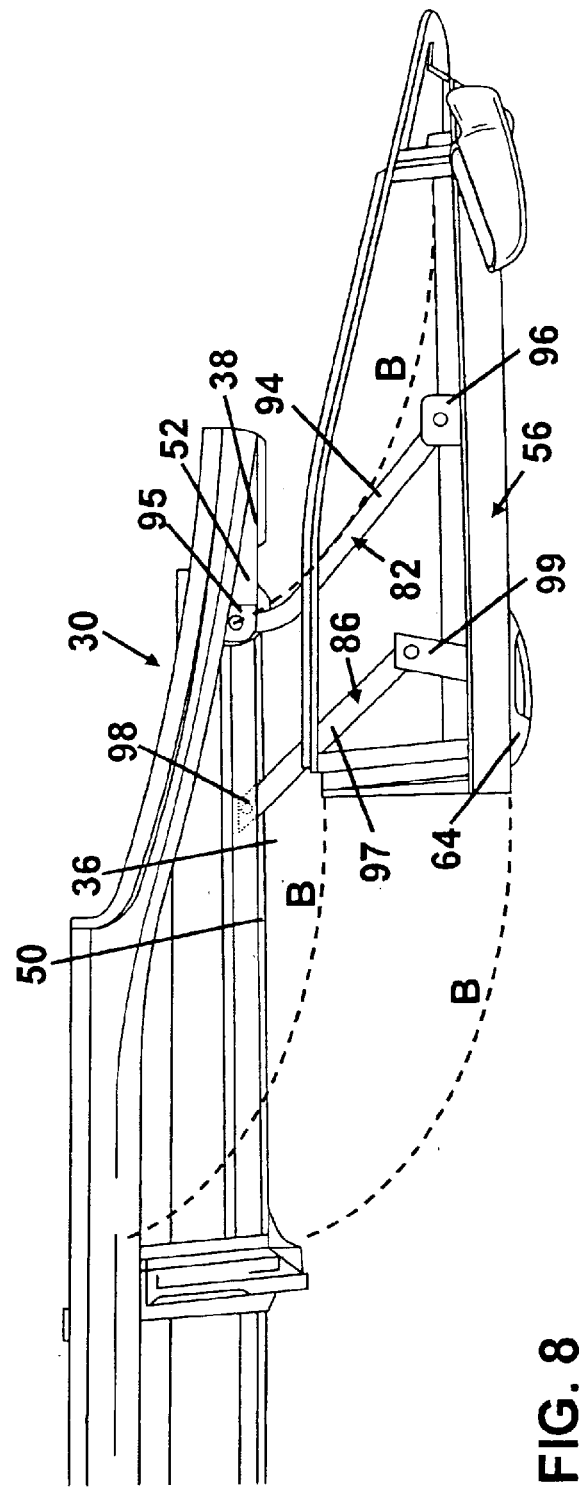
FIG. 8 is an elevated perspective view similar to that of FIG. 7, showing the front door assembly in the open position.

Referring to FIG. 6, the side door 54 upper hinge assembly 80 includes a lever 88 operably attached to a first pivot 89 and a second pivot 90. The lower hinge assembly 84 includes a lever 91 operably attached to a first pivot 92 and a second pivot 93. Referring to FIG. 8, the front door 56 upper hinge assembly 82 includes a lever 94 operably attached to a first pivot 95 and a second pivot 96. The lower hinge assembly 86 includes a lever 97 operably attached to a first pivot 98 and a second pivot 99.

Pivots 89,90,92,93,95,96,98,99 may be positioned adjacent opposing ends of their respective lever 88, 91, 94,97. First pivots 89, 95 may be operably attached to the vehicle 30 at the rear and front body pillar 46, 52, respectively. First pivots 92, 98 may be operably attached to the vehicle 30 at the lower horizontal channels 42,50, respectively. First pivots 89, 92, 95, 98 may be adapted to provide a degree of rotational movement between the levers 88, 91, 94, 97 and the vehicle 30. Second pivots 90, 93, 96, 99 may be operably attached to the doors 54, 56 and may be adapted to provide a degree of rotational movement between the levers 88, 91, 94, 97 and the doors 54, 56.

Levers 88, 91, 94, 97 may be manufactured from a sufficiently rigid material such as steel, aluminum, metal, metal alloy, polymer and the like. Levers 88, 91, 94, 97 may be tubular, including solid or hollow, a flattened bar, or other geometry. In one embodiment, the levers 91, 97 are shaped in substantially a straight (i.e., linear) configuration. Levers 88,94 are shaped in substantially a bent (i.e., curvilinear) configuration thereby allowing the doors 54,56 to have increased travel and to be opened a greater distance from their respective apertures 34, 36. In another embodiment, the levers may include a variety of shapes, geometries, and sizes thereby allowing configuration to various door assembly applications.

Levers 88, 91, 94,97 and their respective pivots 89, 90, 92, 93, 95, 96, 98, 99 are generally adapted to provide the arcuate path movement of the doors 54, 56. For example, as the door 54,56 opens and closes along the lines A, B, the lever 88, 91, 94, 97 may swing about its first pivot 89, 92, 95, 98 while its second pivot 90, 93, 96, 99 maintains the door 54, 56 substantially parallel to the vehicle 30 sidewall portion 38. This compound motion defines the arcuate path movement of the doors 54, 56. Those skilled in the art will appreciate the arcuate path movement is not limited to the presently described and illustrated embodiments. Numerous simple and compound motions may comprise an arcuate path movement consistent with the teachings of the present invention.

Figure 9:
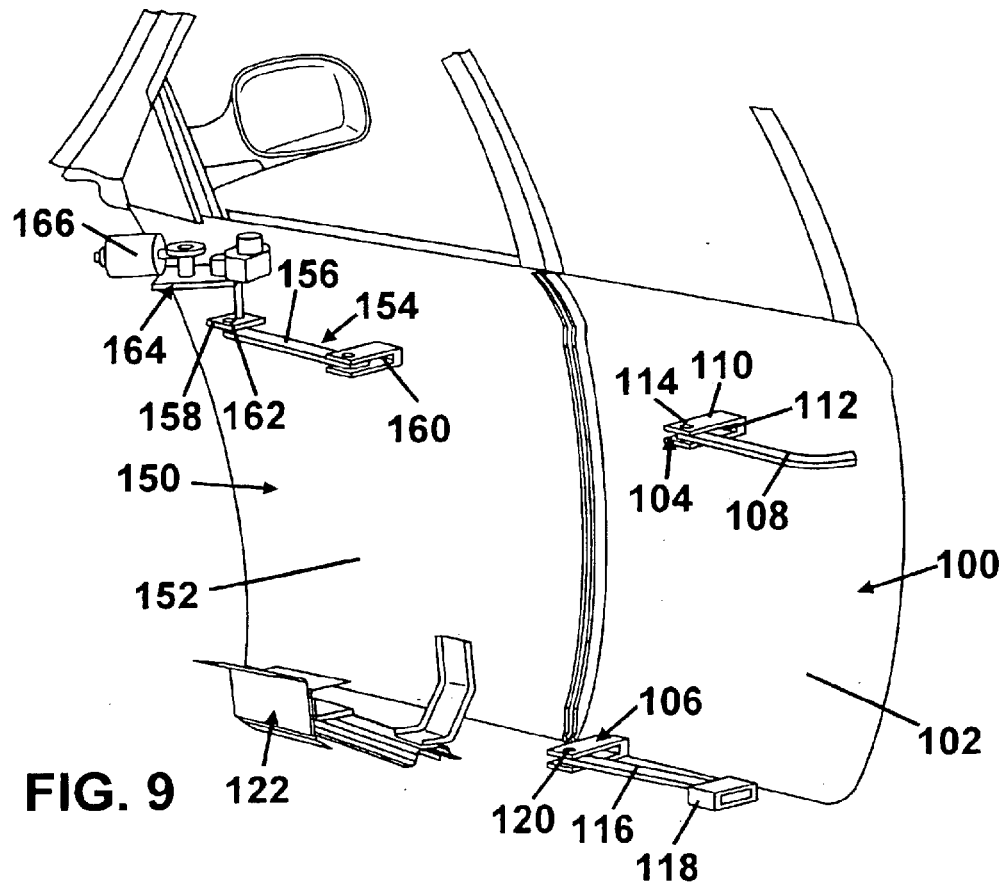
FIG. 9 is an inside perspective view of portions of front and side door assemblies in accordance with the present invention.

Turning now to FIG. 9, portions of two door assemblies 100, 150 constructed in accordance with the present invention are shown. In one embodiment, the door assembly 100 may include a side door 102 operably attached to an upper hinge assembly 104 and a lower hinge assembly 106. Upper hinge assembly 104 includes a lever 108, which is shown in the bent configuration. Lever 108 includes a first pivot (not shown) and a second pivot 110 operably attached to the door 102. Second pivot 110 may be a u-shaped member including an aperture 112 formed therein for receiving one or more bushings 114. Lever 108 may be positioned within the lever u-shaped portion and operably attached to the bushing 114 to provide rotational movement relative to the door 102.

Figure 10:
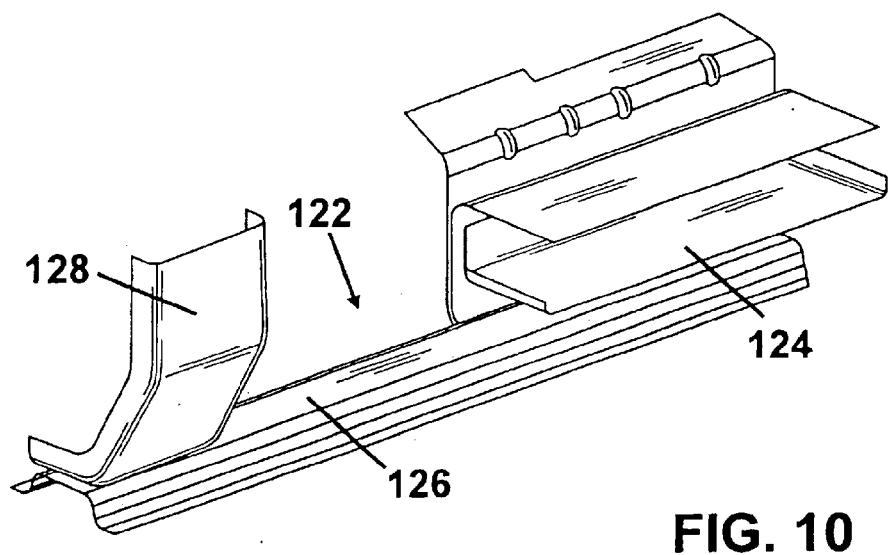
FIG. 10 is a detailed perspective view of an attachment assembly shown in FIG. 9.

Lower hinge assembly 106 includes a lever 116, which is shown in the straight configuration. Lever 116 includes a first pivot (not visible) positioned within a pivot mount 118, and a second pivot 120, which is shown as a u-shaped member operably attached to the door 102. Pivot mount 118 may be a roll-formed section of material surrounding the lower hinge assembly 106 first pivot. Pivot mount 118 may be received within an attachment assembly 122, which is also shown in detail in FIG. 10. Attachment assembly 122 is adapted to provide operable attachment of the lower hinge assembly 106 to the vehicle. Specifically, the pivot mount 118 may be received by a pocket portion 124 formed within the attachment assembly 122. Pivot mount 118 may be fixed within the pocket portion 124 by welding or other attachment means known in the art.

In one embodiment, the attachment assembly 122 may further include a base 126 and one or more, in this case one, pillar mount 128 providing attachment to the vehicle. Base 126 may be positioned adjacent the vehicle lower horizontal channel and the pillar mount 128 may be attached to a vehicle pillar by welding or other attachment means known in the art such as with body in white (BIW) fabrication. In another embodiment, the attachment assembly and pivot mount may include design and component variations while still providing operable attachment of the hinge assembly to the vehicle. The inventors contemplate numerous such variations and that the attachment strategy may differ from vehicle design to vehicle design.

In one embodiment, as shown in FIG. 9, the door assembly 150 may include a front door 152 operably attached to a hinge assembly 154 including a lever 156, which is shown in the straight configuration. Lever 156 includes a first pivot 158 and a second pivot 160 operably attached to the door 152. Second pivot 160 may be similar to the second pivot 110 and provide a similar rotational movement of the lever 156. First pivot 158 may be a planar member including a bushing 162 to provide rotational movement of the lever 156 relative to the vehicle. A drive assembly 164 may be coupled to the door assembly 150 for providing a force to open and/or close the door 152. Drive assembly 164 may be an electrical motor or like device known in the art adapted for automatically opening and/or closing the vehicle door. A hydraulic member 166 may optionally be coupled to the door assembly 150 for providing a hydraulic force against the opening and/or closing movements of the door 152. Hydraulic member 166 generally slows the door 152 movements thereby preventing damage and/or injury that may result from rapid opening and closing.

While the embodiments of the invention disclosed herein are presently considered to be preferred, various changes and modifications can be made without departing from the spirit and scope of the invention. For example, the vehicle and door assembly of the present invention are not limited to any particular design, configuration, location, or attachment strategy. Specifically, the door, aperture, vehicle sidewall portion, hinge assembly and number thereof, pivots, lever, hydraulic member, and drive assembly may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A door assembly for a motor vehicle including an aperture formed therein, a portion of the periphery of the aperture being defined by an upper horizontal channel, a lower horizontal channel, and a vertical body pillar positioned between ends of the upper and lower horizontal channels, the door assembly comprising:
    a door moveable between a closed position substantially covering the aperture and an open position substantially clearing the aperture;
    an upper hinge assembly comprising a substantially elongated lever including a first pivot attached to the door and a second pivot attached to the body pillar the vehicle; and
    a lower hinge assembly comprising a lever including a first pivot attached to the door and a second pivot attached to the lower horizontal channel; wherein the upper and lower hinge assemblies provide an arcuate path movement of the door along the length of the vehicle.

2. The door assembly of claim 1 wherein the door is substantially parallel to a vehicle sidewall portion during movement of the door between the closed and open positions.

3. The door assembly of claim 1 wherein the door comprises at least one of a vehicle front door and a vehicle side door.

4. The door assembly of claim 1 wherein at least one of the levers comprises one of a straight configuration or a bent configuration.

5. The door assembly of claim 1 wherein at least one of the first and second pivots comprises a u-shaped member including an aperture formed therein for receiving a bushing.

6. The door assembly of claim 1 further comprising a pocket portion operably attached to the vehicle, the pocket portion adapted to receive the second pivot of the lower hinge assembly.

7. The door assembly of claim 1 further comprising at least one hydraulic member operably attached to the door assembly.

8. The door assembly of claim 1 further comprising at least one drive assembly operably attached to the door assembly.

9. A motor vehicle comprising:
    a body portion including at least one aperture formed therein, the aperture periphery being partially defined by an upper horizontal channel, a lower horizontal channel, and a vertical body pillar;
    at least one door assembly including a door moveable between a closed position substantially covering the aperture and an open position substantially clearing the aperture;
    an upper hinge assembly comprising a substantially elongated lever including a first pivot operably attached to the door and a second pivot operably attached to the vertical body pillar; and
    a lower hinge assembly comprising a substantially elongated lever including a first pivot operably attached to the door and a second pivot operably attached to the lower horizontal channel, wherein the upper and lower hinge assemblies provide an arcuate path movement of the door along the length of the vehicle.

10. The motor vehicle of claim 9 wherein the door is substantially parallel to the sidewall portion during movement of the door between the closed and open positions.

11. The motor vehicle of claim 9 wherein the door comprises at least one of a vehicle front door and a vehicle side door.

12. The motor vehicle of claim 9 wherein at least one of the levers comprises one of a straight configuration or a bent configuration.

13. The motor vehicle of claim 9 wherein at least one of the first and second pivots comprises a u-shaped member including an aperture formed therein for receiving a bushing.

14. The motor vehicle of claim 9 former comprising a pocket portion operably attached to the vehicle, the pocket portion for receiving the second pivot of the lower hinge assembly.

15. The motor vehicle of claim 9 further comprising at least one hydraulic member operably attached to the door assembly.

16. The motor vehicle of claim 9 further comprising at least one drive assembly operably attached to the door assembly.

* * * * *